(12) United States Patent
Ferchland et al.

(10) Patent No.: US 8,831,553 B2
(45) Date of Patent: Sep. 9, 2014

(54) RECEIVER AND METHOD FOR OPERATING A RECEIVER

(75) Inventors: Tilo Ferchland, Dresden (DE); Eric Sachse, Leipzig (DE); Rolf Jaehne, Ottendorf-Okrilla (DE)

(73) Assignee: Atmel Corporation, San Jose, CA (US)

( * ) Notice: Subject to any disclaimer, the term of this patent is extended or adjusted under 35 U.S.C. 154(b) by 463 days.

(21) Appl. No.: 12/648,987

(22) Filed: Dec. 29, 2009

(65) Prior Publication Data
US 2011/0039512 A1   Feb. 17, 2011

Related U.S. Application Data

(60) Provisional application No. 61/141,075, filed on Dec. 29, 2008.

(30) Foreign Application Priority Data

Dec. 29, 2008 (DE) .......................... 10 2008 063 294

(51) Int. Cl.
*H04B 1/16* (2006.01)
*H04W 52/02* (2009.01)

(52) U.S. Cl.
CPC ................................ *H04W 52/0229* (2013.01)
USPC .................. 455/343.1; 455/343.2; 455/343.3; 455/343.4; 455/343.5

(58) Field of Classification Search
CPC ..................... H04W 52/0229; H04W 52/0203; H04W 52/0235; H04W 52/0245; H04W 52/0261; H04W 52/0264; H04W 52/0274; H04W 52/0277; H04W 52/028; H04W 52/0283
USPC ........... 455/343.1, 343.2, 343.3, 343.4, 343.5
See application file for complete search history.

(56) References Cited

U.S. PATENT DOCUMENTS

| 4,768,032 | A | * | 8/1988 | Sharpe et al. | ................ 340/7.34 |
| 5,376,975 | A | | 12/1994 | Romero et al. | |
| 6,229,989 | B1 | * | 5/2001 | Kwon | ........................ 340/7.33 |
| 6,263,200 | B1 | | 7/2001 | Fujimoto | |
| 7,257,112 | B2 | | 8/2007 | Liang | |
| 7,881,755 | B1 | * | 2/2011 | Mishra et al. | ................. 455/574 |
| 2004/0132410 | A1 | * | 7/2004 | Hundal et al. | ............. 455/67.13 |
| 2005/0159116 | A1 | * | 7/2005 | Xiong | ........................ 455/127.1 |

OTHER PUBLICATIONS

Office Action for German Patent Application 102009057442.5, Apr. 28, 2011.
The Patent Office of the People's Republic of China; The First Office Action for Application No. 200910262546.3; 5 pages, Apr. 16, 2012.

* cited by examiner

*Primary Examiner* — Yuwen Pan
*Assistant Examiner* — Fatuma Sherif
(74) *Attorney, Agent, or Firm* — Baker Botts LLP

(57) ABSTRACT

A receiver and method for operating a receiver, in particular of a radio network, is provided, whereby the receiver includes circuit blocks in a receive path for detecting a preamble of a received signal, and a controller for controlling a receive mode. Whereby at least some of the circuit blocks are designed to be capable of being turned on for a turn-on duration and turned off for a turn-off duration. Whereby, the controller is configured to alternately turn on at least some of the circuit blocks for the turn-on duration and off for the turn-off duration during the receive mode, wherein the turn-off duration is shorter than the preamble. Whereby, the controller is configured to compare a first measured value measured in the receive path to a first threshold, and the controller is configured to change the turn-on duration and/or the turn-off duration on the basis of a result of the comparison with the first threshold, and whereby the controller is configured to compare a second measured value to a second threshold in order to detect a valid signal of the preamble and, on the basis of a result of the comparison with the second threshold, to terminate the turn-off and to drive the portion of the circuit blocks into a turned-on state for a synchronization by means of the preamble.

17 Claims, 3 Drawing Sheets

RECEIVER AND METHOD FOR OPERATING A RECEIVER

This nonprovisional application claims priority to German Patent Application No. DE 10 2008 063 294.5, which was filed in Germany on Dec. 29, 2008, and to U.S. Provisional Application No. 61/141,075, which was filed on Dec. 29, 2008, and which are both herein incorporated by reference.

BACKGROUND OF THE INVENTION

1. Field of the Invention

The present invention relates to a receiver and a method for operating a receiver.

2. Description of the Background Art

The industry standard IEEE 802.15.4, for example, is known for a radio network with receivers and transmitters in a node (transceiver). The industry standard IEEE 802.15.4 is designed especially for radio networks whose nodes can be powered with a battery.

SUMMARY OF THE INVENTION

It is an object of the present invention to provide a method for operating a receiver to the greatest extent possible. Accordingly, a method for operating a receiver with circuit blocks arranged in a receive path is provided. The receiver can be a node of a radio network.

In the method, a receive mode is activated for detection of a preamble. Prior to the receive mode, a sleep mode or a transmit mode was activated, for example, in which reception and the detection of a preamble are not possible. In the receive mode, at least some of the circuit blocks in the receive path of the receiver are alternately turned on for a turn-on duration and turned off for a turn-off duration. The turn-on and turn-off preferably take place cyclically here. During the turn-off duration, a preamble cannot be detected. During the turn-off duration the power consumption of the circuit blocks in the receive path is significantly reduced as compared to the turn-on duration.

The turn-off duration can be shorter than a time duration of the preamble. In the receive mode, a first measured value is measured in the receive path. A plurality of first measured values may be measured in this process. The first measured value can be a value of a receive quantity, for example of a field strength signal (RSSI) or of a correlation signal. Preferably the measurement is accomplished by the circuit blocks located in the receive path.

The first measured value can be compared to a first threshold in receive mode. The first threshold is, for example, a threshold value or a function with which the first measured value is compared. For the comparison, a greater-or-less-than comparison is carried out, for example. Preferably a measured value of a correlation signal or of a field strength signal is detected as the first measured value.

On the basis of a result of the comparison with the first threshold, the turn-on duration and/or the turn-off duration is changed. For example, if the first threshold is exceeded by the first measured value, the turn-on time is increased, for example doubled, and the turn-off time is reduced, for example halved.

The turn-off is terminated and the circuit blocks preferably remain continuously turned on for synchronization by means of the preamble if a valid signal of the preamble is detected during the turn-on duration. Accordingly, the detection of the valid signal of the preamble is an abort condition, wherein the turn-off is terminated when the abort condition is met. A valid signal of the preamble is detected through comparison of a second measured value with a second threshold. Here, the signal of the preamble in this context reflects predefined conditions, so that this signal is recognized as valid by the receiver. The second threshold is, for example, a threshold value or a function with which the second measured value is compared. For the comparison, a greater-or-less-than comparison is carried out, for example.

To detect a valid signal of the preamble, a cross-correlation, for example, or a measurement of the field strength of the received signal takes place, wherein the second measured value in the receive path preferably can be detected by the circuit blocks. Preferably a measured value of a correlation signal or of a field strength signal is detected as the second measured value. In particular, the measured value of the field strength signal an RSSI value (received Signal Strength Indicator). It is possible for the first measured value and the second measured value to be detected from the same receive quantity or from different receive quantities.

The invention has the additional object of specifying a receiver that is improved to the greatest degree possible.

Accordingly, a receiver is provided. The receiver is preferably designed as an integrated circuit. Preferably the receiver is configured for operation in a radio network.

The receiver has circuit blocks in a receive path for detecting a preamble of a received signal.

In addition, the receiver has a controller for controlling a receive mode.

At least some of the circuit blocks are designed to be capable of being turned on for a turn-on duration and turned off for a turn-off duration. For example, the circuit blocks each have a control input (enable), wherein the circuit blocks can be turned on and off by means of a control signal at their control inputs. Alternatively, it is possible to provide a single controllable power switch to switch supply currents to multiple circuit blocks, for example.

The controller can be configured to alternately turn the circuit blocks on for the turn-on duration and off for the turn-off duration during the receive mode. To this end, the controller is configured to output a control signal, for example. The turn-off time is shorter than a length of the preamble.

The controller can be configured to compare a first measured value measured in the receive path to a first threshold. For instance, the controller has for this purpose a computing unit with a first comparison function or a first analog or digital comparator. Preferably the circuit blocks in the receive path are configured to measure and output the first measured value.

The controller can be configured to change the turn-on duration and/or the turn-off duration on the basis of a result of the comparison with the first threshold. The controller is configured to control the circuit blocks in the receive path by means of a control signal governed by the turn-on duration and/or turn-off duration. For example, the controller has an adjustable on timer for the turn-on time and an adjustable off timer for the turn-off time. For instance, the run time of the on timer or the off timer can be set by, e.g., the controller.

The controller can be configured to compare a second measured value measured in the receive path to a second threshold in order to detect a valid signal of the preamble. To this end, the controller has a computing unit with a second comparison function or a second analog or digital comparator, for example. Preferably the circuit blocks in the receive path are configured to measure and output the second measured value.

The controller can be configured to terminate the turn-off on the basis of a result of the comparison with the second threshold, for example upon complete reception of the transmitted data, and to drive the portion of the circuit blocks into a turned-on state for a synchronization by means of the preamble.

The embodiments described below relate to both the receiver and to the method for operating the receiver. In this regard, functions of the receiver derive from corresponding features of the method. Features of the method can be derived from the function of the receiver.

According to an embodiment, provision is made that the first threshold and/or the second threshold is adjusted. For example, the first threshold or second threshold is adjusted when a radio network is set up as a function of existing boundary conditions such as distances between the nodes, interference sources, or neighboring networks. It is also possible to change the first threshold and/or the second threshold for adjustment in ongoing operation as a function of measured values, such as a field strength signal of a neighboring node of the same radio network, for example.

The measured value can be measured at a point in the receive path. For example, the measured value is an RSSI value for the field strength of the signal received in the channel. Alternatively, the measured value is a correlation signal from a correlator, in particular a cross-correlator. The turn-on duration and the turn-off duration are preferably constant prior to a change in the turn-on duration and the turn-off duration. For example, a control signal for turn-on and turn-off is periodic beforehand. After termination of a turn-off on account of the abort condition, the cyclic turn-on and turn-off of the circuit blocks can be reactivated if an activation condition, for example the full reception of data that follow the preamble, is completed.

According to an embodiment, the turn-on duration and the turn-off duration are controlled by at least one timer of a control circuit.

In one variant embodiment, provision can be made that the turn-on duration is equal to or greater than one, in particular two, symbol lengths of symbols of the preamble.

In another embodiment, the circuit blocks in the receive path are designed to perform a synchronization to a preamble signal of the preamble within a synchronization duration. Preferably the synchronization duration is shorter than a length of the preamble. It is especially preferred for the synchronization duration to be shorter than three quarters, or shorter than half, of the length of the preamble.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein.

DETAILED DESCRIPTION

Figure 2:
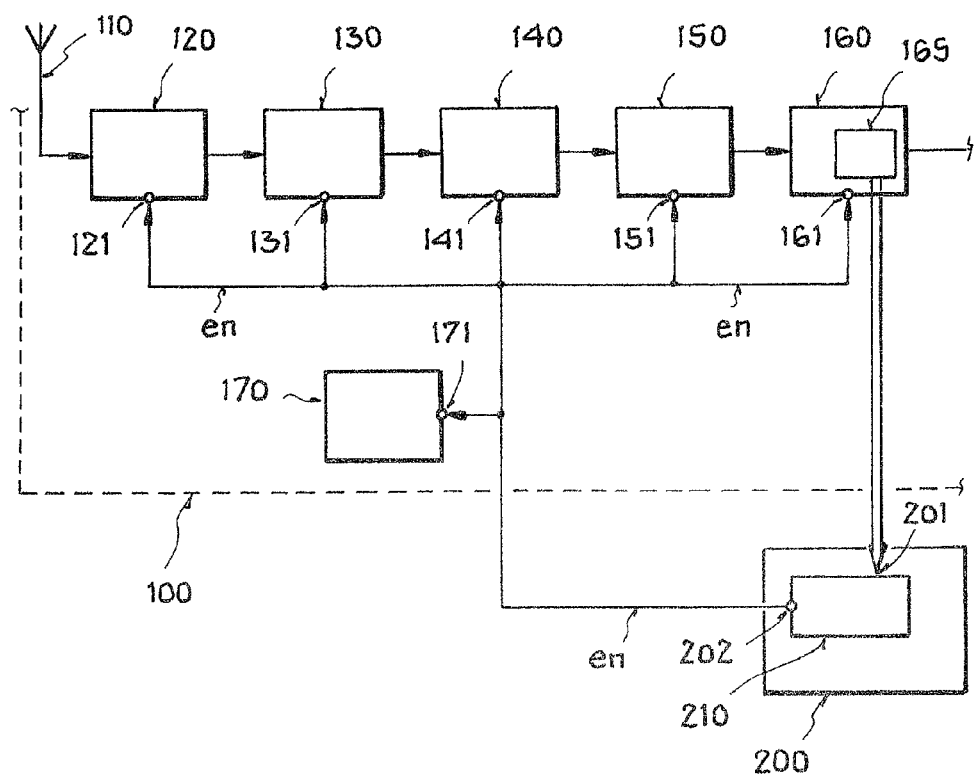
FIG. 2 is a block diagram of a receiver.

FIG. 2 schematically shows a receiver of a node of a radio network by means of a schematic block diagram of a monolithic integrated circuit. The block diagram in FIG. 2 is described by way of example for the industry standard IEEE 802.15.4. However, the functionality can also be used for other radio networks or cable networks.

FIG. 2 schematically shows a receive path 100 in which are arranged circuit blocks 120, 130, 140, 150, 160, 170, which are connected to one another in order to analyze a signal received through an antenna 110. In this case, the circuit blocks 120, 130, 140, 150, 160, 170 are designed and configured to detect a transmitted preamble. Detection of the preamble can also be referred to as determination. The preamble is described in detail with reference to FIG. 1. In conformance with the industry standard IEEE 802.15.4, the circuit blocks 120, 130, 140, 150, 160, 170 include an input amplifier 120 (LNA, Low Noise Amplifier), a filter 130 (SSBF, Single Side Band Filter), a limiter 140, a digital input circuit 150 (DFE, Digital Front End), a digital baseband circuit 160 (DBB, Digital Base Band), and a phase-locked loop 170 (PLL).

Together, all circuit blocks 120, 130, 140, 150, 160, 170 of the example embodiment from FIG. 2 can result in a current drain between 10 mA and 12 mA in a receive mode. In contrast, the functionality of the circuit blocks 120, 130, 140, 150, 160, 170 of the example receive path 100 is not needed in a sleep mode. For this reason, the circuit blocks 120, 130, 140, 150, 160, 170 are designed to be turned on and off. The control of the turn-on and turn-off of the circuit blocks 120, 130, 140, 150, 160, 170 is accomplished by the controller 200 by means of the control signal en. For control by means of the control signal, the controller 200 is connected to control inputs 121, 131, 141, 151, 161, 171 of the circuit blocks 120, 130, 140, 150, 160, 170.

The controller 200 is configured to control the receive mode and the sleep mode. In addition, the controller 200 has a power-saving function for the receive mode, which is explained in detail in FIGS. 1 and 3. The power-saving function is accomplished by a control circuit 210 of the controller 200. The control circuit 210 is preferably designed as a state machine (FSM, Finite State Machine). The control circuit 210 is designed to alternately turn the circuit blocks 120, 130, 140, 150, 160, 170 on for a turn-on duration and off for a turn-off duration during the receive mode, which is explained in detail in FIGS. 1 and 3. In order to determine the turn-on duration and turn-off duration, the control circuit 210 has, e.g., one or more timers. In contrast, other circuit sections, as for example a quartz crystal oscillator or a regulated voltage source, remain continuously turned on during the receive mode to permit rapid activation of the circuit blocks 120, 130, 140, 150, 160, 170 into a desired operating point during the turn-on duration.

The control circuit 210 is configured here such that the turn-off duration is shorter than the length of the transmitted preamble in order to control the turn-on and turn-off of the circuit blocks 120, 130, 140, 150, 160, 170. The turn-off duration can be determined from the length of the preamble minus a minimum synchronization time determined by the circuit, for example. For adjusting the turn-off duration and the turn-on duration, the controller 210 preferably has a timer, which outputs the control signal en at the output 202 of the control circuit 210 in receive mode. To this end, the phase-locked loop 170 is designed such that it has already settled within a fraction of the duration of the preamble. The calibration of the phase-locked loop 170 to the desired frequency (2.4 GHz) is automated by the alternating turn-on and turn-off of the phase-locked loop 170 in receive mode.

As an advantageous side effect, the phase-locked loop 170 automatically calibrates itself at each turn-on, so that, e.g., temperature variations can be compensated better. For this purpose, it is necessary for the phase-locked loop 170 to have a fast settling behavior. It is thus unnecessary for the phase-locked loop 170 to undergo recalibration triggered by a microcontroller (not shown) during a long uninterrupted receive mode.

The circuit blocks 120, 130, 140, 150, 160, 170 in the receive path 100 are designed to perform a synchronization to a preamble signal of the preamble within a synchronization duration. The synchronization duration here is shorter than a length of the preamble. For example, the synchronization requires only half of the preamble signal.

Turn-off of the circuit blocks 120, 130, 140, 150, 160, 170 takes place during the turn-off duration, even though the functionality of the circuit blocks 120, 130, 140, 150, 160, 170 would actually be required for detection of the preamble. Investigations carried out by the applicant have shown, however, that the power consumption can be significantly reduced through the exemplary embodiment from FIG. 2 with only minor sacrifices in receiver sensitivity and performance. The alternating turn-on and turn-off of the circuit blocks 120, 130, 140, 150, 160, 170 achieves the advantage that the average power consumption of the circuit blocks 120, 130, 140, 150, 160, 170 is significantly reduced. For example, if equal turn-on duration and turn-off duration are assumed, hence a duty cycle of approximately 1:1, approximately half of the power consumption caused by the circuit blocks 120, 130, 140, 150, 160, 170 during the time until reception of a valid signal can be avoided.

The control circuit 210 is also designed to analyze measurement results of received signals. The control circuit 210 is preferably configured to change the control signal en as a function of a measurement result. For example, the control circuit 210 analyzes a field strength signal (RSSI, Received Signal Strength Indication). When the field strength signal exceeds a first threshold value and/or a second threshold value, for instance, the control circuit 210 drives the circuit blocks 120, 130, 140, 150, 160, 170 into the turned-on state by means of the control signal en or changes the turn-on duration.

In the example embodiment in FIG. 2, the digital baseband circuit 160 has a correlator 165, for example a cross-correlator, to output a correlation result to the input 201 of the control circuit 210. A valid received preamble signal is detected by the correlation of the correlator 165, and a corresponding correlation signal is output to the control circuit 210. The control circuit 210 is designed to drive the circuit blocks 120, 130, 140, 150, 160, 170 into the turned-on state by means of the control signal en as a function of the correlation signal—for example, by comparing the correlation signal with a threshold of a comparator—so that the synchronization to the preamble signal can take place.

Radio systems that transmit frames with a preamble use the preamble for frame detection and synchronization. If the preamble is longer than the required synchronization time, then an algorithm can be used wherein frame search phases, which can also be called the turn-on duration, alternate with turn-off phases, which can also be called the turn-off duration, during a receive mode. If a frame is possibly detected during the search phase/turn-on duration, the search is continued until either the frame is detected with certainty or an abort/turn-off criterion is met. Such an abort/turn-off criterion is implemented by a detection of an indicator (SFD), for example. If the indicator (SFD) is not detected within a predefined time period after detecting the preamble, the timer of the control circuit 210 is reset and the circuit blocks 120, 130, 140, 150, 160, 170 of the receive path 100 are once again alternately turned on and off. Additional conditions can also be analyzed for this purpose.

Figure 1:
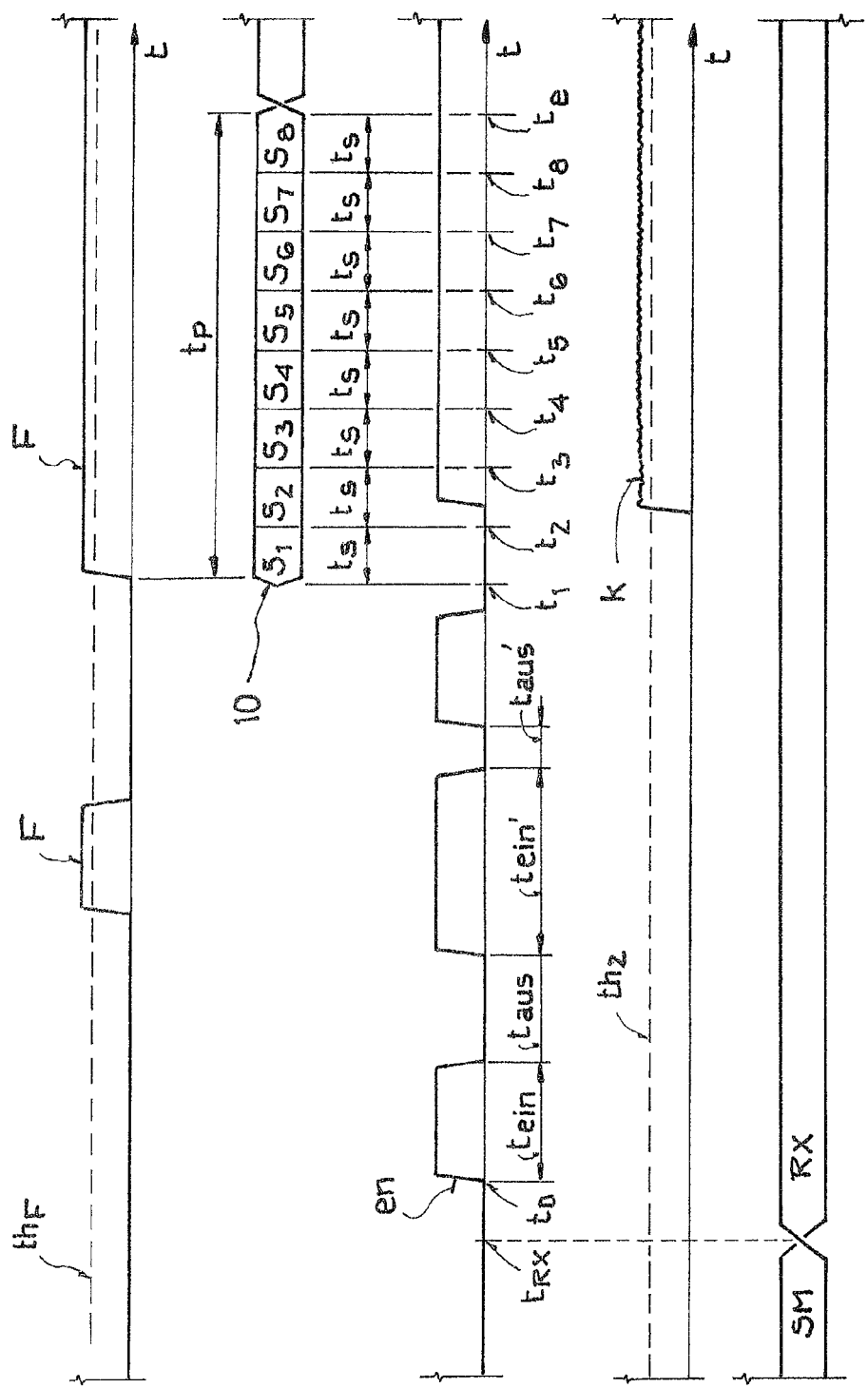
FIG. 1 is a diagram.

FIG. 1 schematically shows a diagram. The diagram is discussed for the example of the industry standard IEEE 802.15.4. At the time tRX, there occurs a change from a sleep mode SM to a receive mode RX, in which the receiver is configured to receive data from another node in the radio network. During the sleep mode SM the controller 200 is inactive. The controller 200 is activated with the receive mode RX. The receive mode RX starts with a search phase in which the receiver attempts to detect a valid signal of a preamble 10. In FIG. 1, however, a beginning of the preamble 10 is not transmitted until the time t1, so that the receiver listens on the transmission channel between the times t0 and t1. The search phase is necessary because precisely when and whether a preamble is transmitted is not determined in the radio network. Thus, a great deal of power can be consumed by the receiver during the search phase without the receiver being able to carry out a function such as the reception of data as a result.

In order to keep from missing the time window of the transmission of the preamble 10, and to achieve the highest degree of sensitivity, the receiver should continuously perform a correlation. In the exemplary embodiment from FIG. 1, however, circuit blocks 120, 130, 140, 150, 160, 170 of the receive path 100 are turned off during a turn-off duration taus, taus', although this time could actually be used for detection of the preamble. Investigations carried out by the applicant have shown, however, that the sacrifices in receiver sensitivity and performance resulting from the turn-off duration taus, taus' can be largely compensated through the use of a first threshold thF and a second threshold th2.

Starting at the time t0, the turn-on and turn-off of the circuit blocks 120, 130, 140, 150, 160, 170 of the receive path 100 is controlled in alternation by means of the control signal en. In the example embodiment in FIG. 1, a turn-on duration tein is represented schematically by a high level of the control signal en, and a turn-off duration taus by a low level of the control signal en. During the turn-on duration tein, the receiver listens to the channel to determine whether a valid signal of a preamble 10 is being transmitted.

In addition, a field strength signal F—for example an RSSI value—is detected and compared to the first threshold thF. In the exemplary embodiment from FIG. 1, the turn-on duration tein and the turn-off duration taus are initially approximately equal in length, so that a duty cycle of approximately 1:1 is adjusted. If the field strength signal F exceeds the first threshold thF, the turn-on duration tein' is extended and/or the turn-off duration taus' is shortened. The duty cycle can also be changed. In FIG. 1, the first threshold thF is shown as the threshold value. Alternatively (not shown in FIG. 1), the first threshold thF can also be designed as a function. It is also possible for the first threshold thF to be adjustable or to be automatically changed as a function of a control value or measured value.

A preamble signal of a preamble 10 is received at the time t1. The preamble has a length tp. Within the preamble 10 in the industry standard IEEE 802.15.4, eight symbols 51, S2, S3, S4, S5, S6, S7 and S8, each with a symbol length ts of 16 us, are transmitted at the times t1, t2, t3, t4, t5, t6, t7, t8. Starting at the time te, additional data of the frame are received and analyzed. At the time t1, in the example embodiment in FIG. 1, the measurable field strength F can likewise rise significantly. However, the rise need not necessarily take place. It is also possible to detect a signal in noise through correlation as a result of spreading. FIG. 1 also shows a behavior of measured values of a correlation signal k at the output of a correlator. Between the times t2 and t3, measured values of the correlation signal k exceed a second threshold th2, wherein the preamble 10 is recognized as valid by the receiver when the measured values of the correlation signal k exceed the second threshold th2. In FIG. 1, the second threshold th2 is shown as the threshold value. Alternatively (not shown in FIG. 1), the second threshold th2 can also be designed as a function. It is also possible for the second threshold th2 to be adjustable or to be automatically changed as a function of a control value or measured value.

In the example embodiment shown in FIG. 1, the receiver in the turn-off phase cannot detect the preamble 10 during the transmission of the first two signals S1 and S2 of the preamble 10. The receiver requires a minimum time duration to detect a preamble signal. For example, between the times t3 and t5 of the symbols S3 and S4, a preamble signal is detected by means of the cross-correlator 165 in that measured values of the correlation signal k exceed the second threshold th2. The control circuit 210 sets the control signal en to a high level, so that the circuit blocks 120, 130, 140, 150, 160, 170 of the receive path 100 also remain turned on for the subsequent symbols S5, S6, S7 and S8 of the preamble 10. Alternatively or in combination, the field strength signal F could also be analyzed. If, in contrast to the case shown in FIG. 1, no valid signal of a preamble is detected, the alternating turn-on and turn-off in the receive mode RX is continued until another transition to a sleep mode or a transmit mode takes place or a signal of a valid preamble is later detected.

The search phase prior to reception of the preamble 10 is typically significantly longer than an actual reception period of the reception of the frames. For this reason, the average power consumption in the receive mode can be significantly reduced overall.

Figure 3:
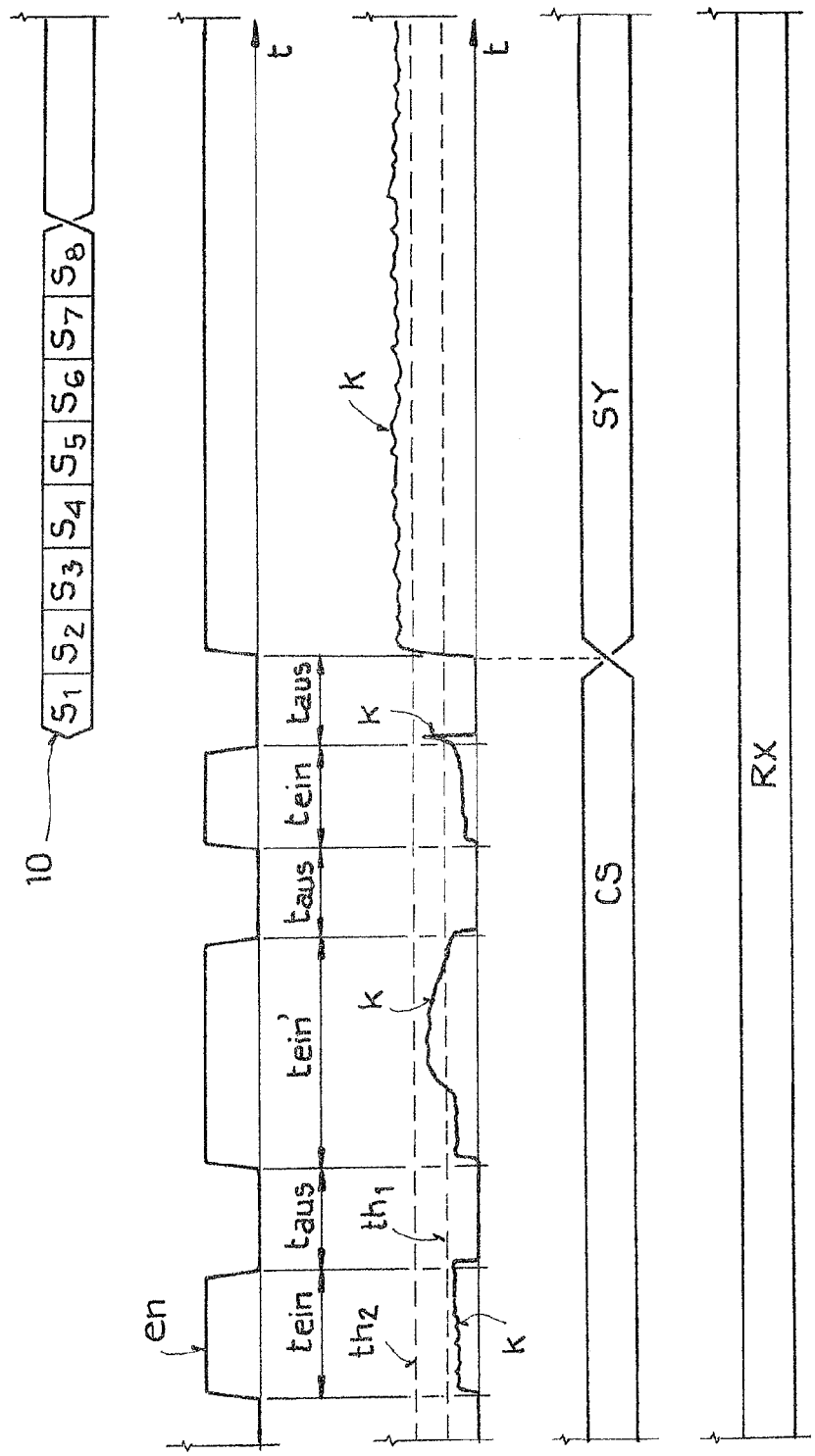
FIG. 3 is a timing diagram.

FIG. 3 shows another exemplary embodiment in which a preamble 10 with eight symbols S1 to S8 is likewise transmitted. Measured values of the correlation signal k are compared to a first threshold th1 and to a second threshold th2. In this case, the first threshold th1 is lower than the second threshold th2. In the receive mode RX, a power-saving phase CS takes place before a synchronization phase SY. In the synchronization phase SY, a signal of the preamble 10 is recognized as valid by the receiver, and the receiver synchronizes itself to the signal of the preamble 10. The necessary duration of the synchronization phase SY here is shorter than the duration of the preamble 10.

During the power-saving phase CS, circuit blocks 120, 130, 140, 150, 160, 170 in the receive path 100 of the receiver are alternately turned on for a turn-on duration tein and turned off for a turn-off duration taus. Also shown is a behavior of measured values of the correlation signal k. If a measured value of the correlation signal k exceeds the first threshold th1, the turn-on duration tein' of the circuit blocks 120, 130, 140, 150, 160, 170 in the receive path 100 of the receiver is extended by driving via the control signal en. This is shown schematically in FIG. 3 by the extended signal en. If a measured value of the correlation signal k also exceeds the second threshold th2, the turn-off is terminated and the circuit blocks 120, 130, 140, 150, 160, 170 in the receive path 100 remain turned on for synchronization during the synchronization phase SY.

The invention is not restricted to the variant embodiments shown in FIGS. 1 and 2. For example, it is possible to provide a different correlator. It is also possible to deactivate different circuit blocks in the receive path than those shown in FIG. 2. The functionality of turn-on and turn-off during the receive mode may also be used for other radio networks complying with different industry standards, and may also be used for wired networks, as long as the preamble has adequate length.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. A method comprising:
activating a receive mode to detect a preamble; and alternately turning on, during a receive mode, at least some circuit blocks in a receive path of a receiver for a turn-on duration and then turning off the at least some of the circuit blocks for a turn-off duration,
wherein the turn-off duration is shorter than the preamble,
wherein a first measured value is measured in the receive path,
wherein the first measured value is compared to a first threshold,
wherein one or more of the length of the turn-on duration and the length of the turn-off duration is changed based on a result of the comparison with the first threshold,
wherein the turn-off duration is terminated, the length of the turn-on duration is extended, and the circuit blocks remain turned on for synchronization by the preamble if a valid signal of the preamble is detected during the turn-on duration by comparison of a second measured value with a second threshold, and
wherein one or more of the first threshold and the second threshold is adjustable as a function of one or more of a control value and a third measured value,
wherein the third measured value is a field strength signal of a neighboring node; and
wherein the control value is an existing boundary condition comprising one or more of a distance between nodes, interference sources, or neighboring networks.

2. The method according to claim 1, wherein a measured value of a correlation signal or of a field strength signal is detected as the first measured value.

3. The method according to claim 1, wherein a measured value of a correlation signal or of a field strength signal is detected as the second measured value.

4. The method according to claim 1, wherein one or more of the turn-on duration and the turn-off duration are controllable by a timer of a control circuit.

5. The method according to claim 1, wherein the turn-on duration is equal to or greater than one symbol length of symbols of the preamble.

6. The method according to claim 1, wherein the first measured value is a measured value of a correlation signal or of a field strength signal.

7. The method according to claim 1, wherein the second measured value is a measured value of a correlation signal or of a field strength.

8. The method according to claim 1, wherein extending the length of the turn-on duration includes causing the circuit blocks to remain turned on for a period of time that is longer than the duration of the preamble.

9. The method according to claim 1, wherein extending the length of the turn-on duration includes causing the circuit blocks to remain turned on through the end of the preamble and into a period of time in which additional information is sent to the receiver.

10. The method according to claim 1, wherein at least one of the circuit blocks in the receive path of the receiver automatically calibrates itself when turned on.

11. A receiver comprising:
circuit blocks arranged in a receive path and configured to detect a preamble of a received signal; and
a controller configured to control a receive mode,
wherein at least some of the circuit blocks are configured to be turned on for a turn-on duration and turned off for a turn-off duration,
wherein the controller is configured to alternately turn on at least some of the circuit blocks for the turn-on duration and turn off the at least some of the circuit blocks for the turn-off duration during the receive mode, the turn-off duration being shorter than the preamble,
wherein the controller is configured to compare a first measured value measured in the receive path to a first threshold, wherein the controller is configured to change one or more of the length of the turn-on duration and the length of the turn-off duration based on a result of the comparison with the first threshold,
wherein the controller is configured to compare a second measured value to a second threshold in order to detect a valid signal of the preamble and, on the basis of a result of the comparison with the second threshold, to terminate the turn-off duration, to extend the length of the turn-on duration, and to drive the at least some of the circuit blocks in a turned-on state for a synchronization by the preamble, and
wherein the controller is configured to adjust one or more of the first threshold and the second threshold as a function of one or more of a control value and a third measured value,
wherein the third measured value is a field strength signal of a neighboring node; and
wherein the control value is an existing boundary condition comprising one or more of a distance between nodes, interference sources, or neighboring networks.

12. The receiver according to claim 11, wherein the circuit blocks in the receive path are configured to perform a synchronization to a preamble signal of the preamble within a synchronization duration, wherein the synchronization duration is shorter than a length of the preamble or is shorter than three quarters or shorter than half of the length of the preamble.

13. The receiver according to claim 11, wherein the first measured value is a measured value of a correlation signal or of a field strength signal.

14. The receiver according to claim 11, wherein the second measured value is a measured value of a correlation signal or of a field strength signal.

15. The receiver according to claim 11, wherein one or more of the turn-on duration and the turn-off duration are controllable by a timer of the controller.

16. The receiver according to claim 11, wherein the turn-on duration is equal to or greater than one symbol length of symbols of the preamble.

17. The receiver according to claim 11, wherein at least one of the circuit blocks in the receive path of the receiver automatically calibrates itself when turned on.

* * * * *